Figure 1:
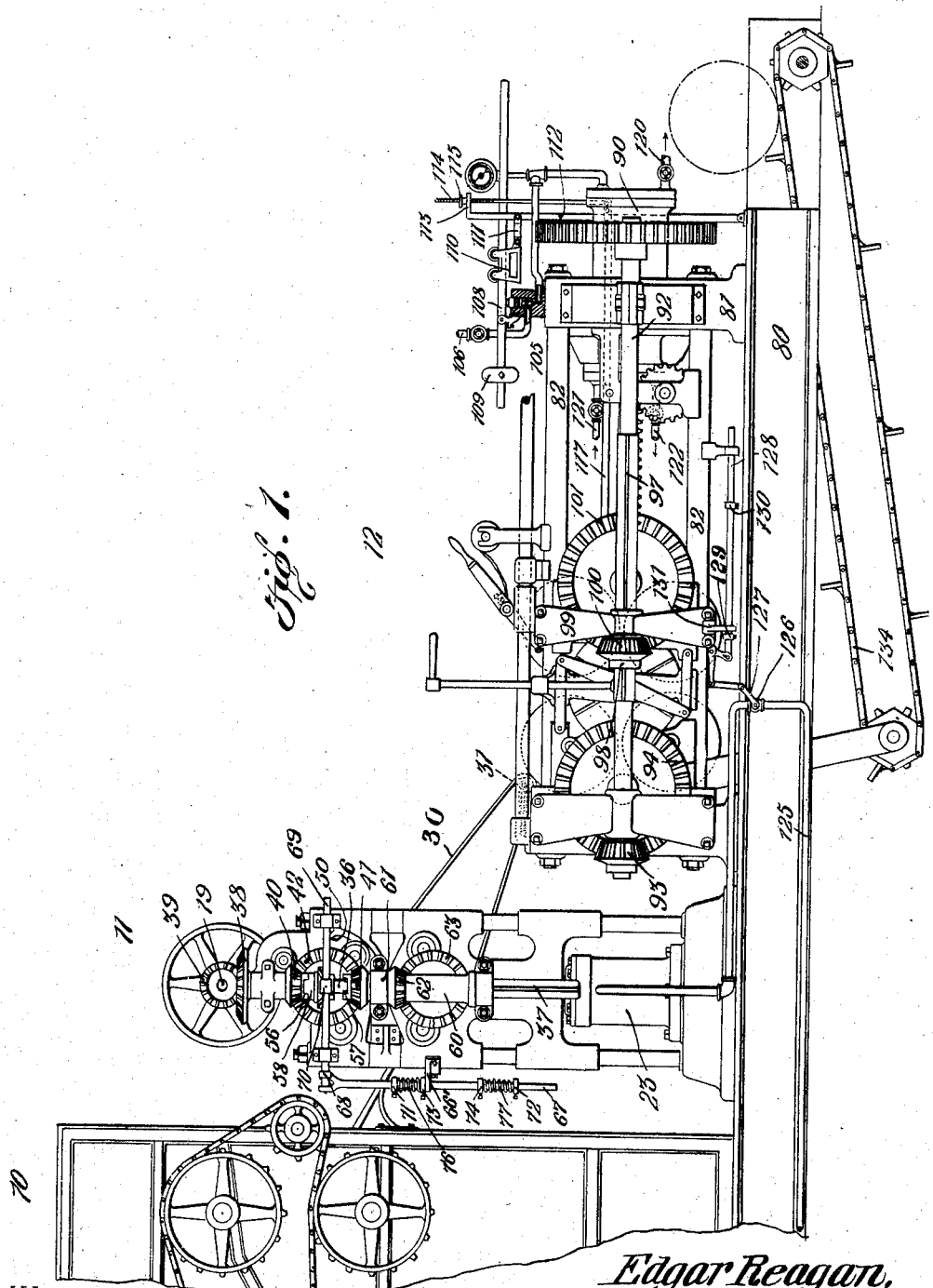

No. 865,316. PATENTED SEPT. 3, 1907.
E. REAGAN.
BALE FORMING APPARATUS.
APPLICATION FILED JULY 7, 1906.

5 SHEETS—SHEET 4.

WITNESSES:
E. F. Stewart
Jno. E. Parker

Edgar Reagan, INVENTOR
By C. A. Snow & Co.
ATTORNEYS

No. 865,316. PATENTED SEPT. 3, 1907.
E. REAGAN.
BALE FORMING APPARATUS.
APPLICATION FILED JULY 7, 1906.

5 SHEETS—SHEET 5.

WITNESSES:

Edgar Reagan,
INVENTOR.
By C. A. Snow & Co.
ATTORNEYS

UNITED STATES PATENT OFFICE.

EDGAR REAGAN, OF SAN ANTONIO, TEXAS, ASSIGNOR, BY MESNE ASSIGNMENTS, TO REAGAN BALE COMPANY, OF SAN ANTONIO, TEXAS.

BALE-FORMING APPARATUS.

No. 865,316.	Specification of Letters Patent.	Patented Sept. 3, 1907.

Application filed July 7, 1906. Serial No. 325,121.

*To all whom it may concern:*

Be it known that I, EDGAR REAGAN, a citizen of the United States, residing at San Antonio, in the county of Bexar and State of Texas, have invented a new and useful Bale-Forming Apparatus, of which the following is a specification.

This invention relates to a system of and apparatus for forming round bales of cotton and other material.

In the baling of cotton it is usual to take the cotton directly from the gin to the press, and in the formation of round bales, it is usual to form a bat at a point between the gin and the roller press. To secure economy of operation it is desirable that the gin operate continuously, and as the press must stop to deliver the finished bale and be readjusted before the commencement of another bale forming operation, it has been found a matter of difficulty to take care of the cotton being delivered from the gin between the intervals of operation of the press, and in many cases it has been found necessary to employ two presses, the bat being diverted from one press to the other after the completion of each bale, and while the second press is at work there is ample time to bag or cover the bale formed at the first press, and to remove the same and readjust the press in readiness for another operation when the second press starts to deliver its bale. In other cases the lint has been retained in reservoirs adjacent to the press, and it has, also, been proposed to wind the bat on an auxiliary roller as soon as the press stops, and then unwind the same from the roller and start the press feeding operation before the commencement of another bale.

The principal object of the present invention is to overcome these and other difficulties which have been found in the formation of round cotton bales, and to provide an improved method of and apparatus for forming the bat into bales, and for taking care of the bat between intervals of operation of the press.

A further object of the invention is to provide means whereby on the stopping of the press, the bat will be automatically severed and wound into the form of a core or small bale, this operation progressing at relatively slow speed, and the small core or bale being delivered to the press as soon as the latter is again started, and the winding and compressing of the bat being continued until the bale is completed.

A still further object of the invention is to provide an apparatus of this nature whereby a core or small bale may be formed, and the whole delivered to the main press without breaking or severing the bat, while the core forming apparatus is utilized as a bat compressing means during the operation of the press.

A still further object of the invention is to provide an apparatus whereby a core of cotton may be formed and delivered to the roller press.

With these and other objects in view, the invention consists in the improved method of and apparatus for forming round bales, hereinafter described, illustrated in the accompanying drawings, and particularly pointed out in the appended claims.

Figure 2:
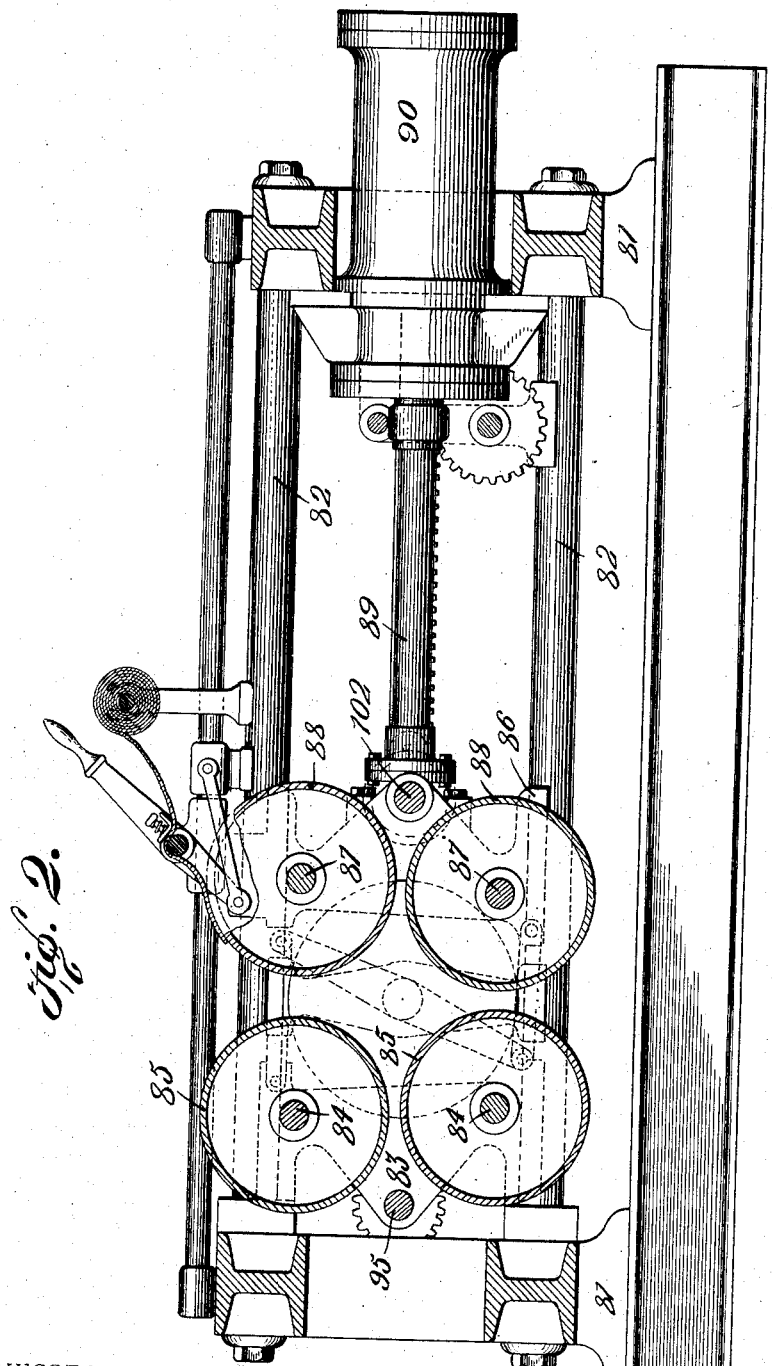
Figure 3:
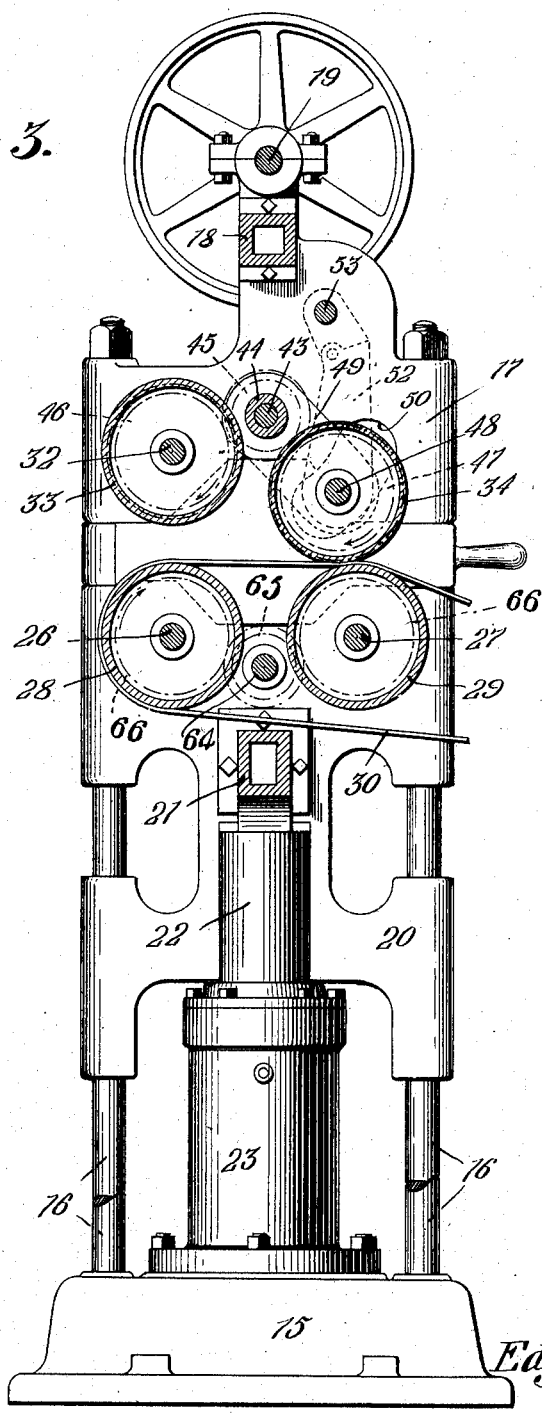
Figure 4:
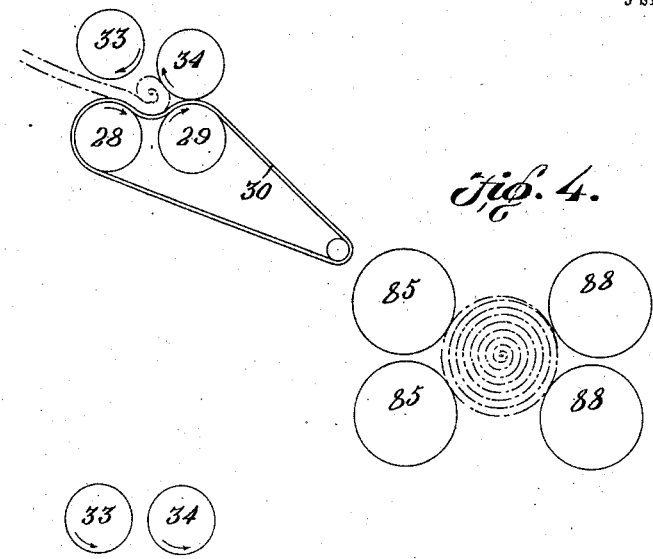
Figure 5:
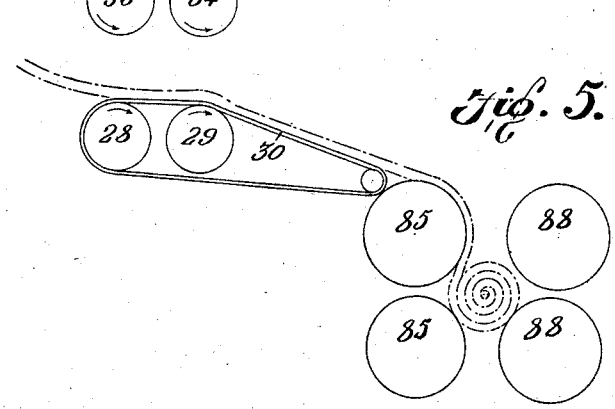
Figure 6:
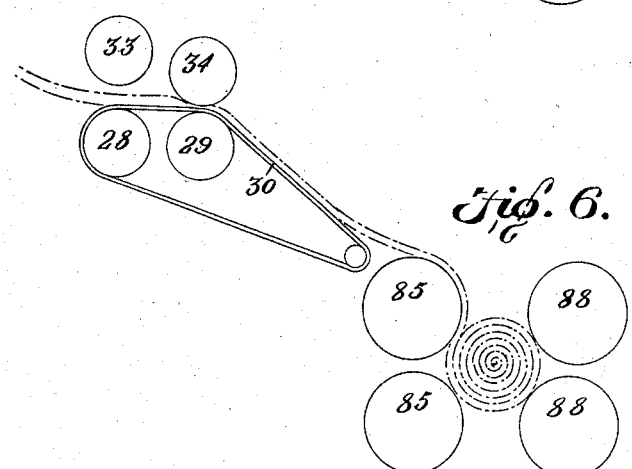
Figure 7:
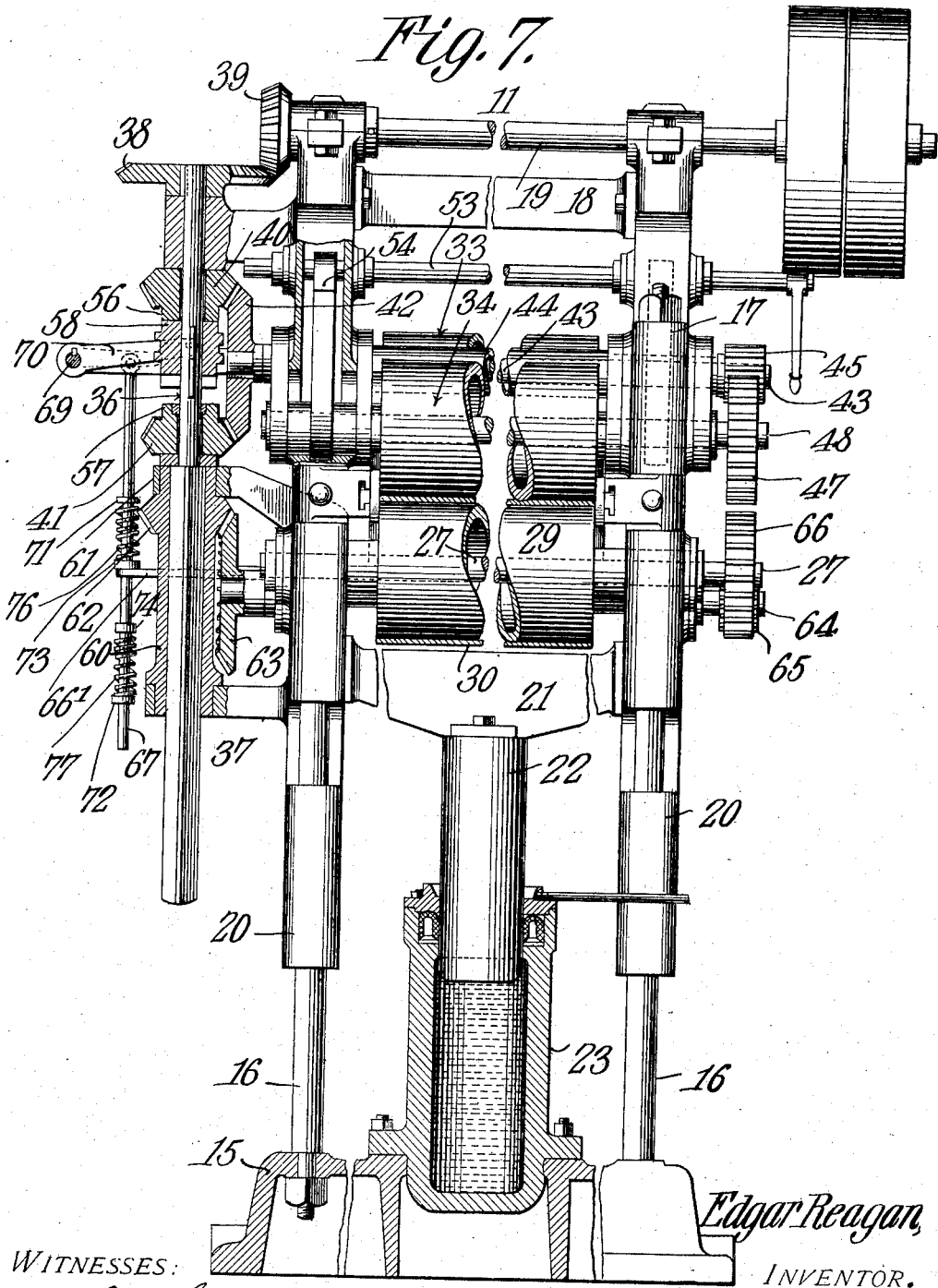

In the accompanying drawings:—Figure 1 is a side elevation of a bale forming apparatus arranged and constructed in accordance with the invention. Fig. 2 is a vertical sectional view of the main baling press. Fig. 3 is a similar view of the preliminary press in which the bat is taken care of during the time the main press is stopped for the removal of the bale and the necessary readjustments. Fig. 4 is a diagram illustrating the position of the parts after the press has been stopped to remove the bale, and showing the manner in which the preliminary press winds the bat into the form of a core or small bale. Fig. 5 is a similar view, showing the core or small bale transferred to the main press. Fig. 6 is a similar view showing the process of working the main press while the preliminary press acts as a bat condenser. Fig. 7 is a vertical sectional view of the core forming element.

Similar numerals of reference are employed to indicate corresponding parts throughout the several figures of the drawings.

In the drawings, 10 indicates a cotton feeder, 11 the preliminary press, and 12 the main baling press.

The feeder may be in the form of any suitable mechanism, and in the present instance is shown as forming a part of a cotton cleaning and condensing machine to which the cotton is delivered from a gin, the cotton being cleaned and condensed into the form of a bat, which thence passes to the preliminary press 11. This feeder, however, may simply be at the end of the lint flue leading from the cotton gin, the apparatus contemplating the employment of any means by which the cotton bat may be fed to the preliminary press.

The preliminary press is mounted on a base 15 and is provided with a plurality of vertically disposed posts 16, of which there is preferably a pair at each side of the machine. These posts carry housings or cheek plates 17 that are rigidly secured to the upper ends of the posts, and said housings are firmly connected by a cross bar 18 which carries bearings for the support of a driven shaft 19 through which motion is imparted to the several parts of the preliminary press. The vertical posts 16 also form guides for the reception of vertically movable housings 20, and these movable housings are connected by a cross bar 21 that is secured to the upper end of a plunger 22, the latter fitting within a fluid pressure cylinder 23 to which a fluid under pressure may be admitted for the purpose of raising said movable housings, and during the operation of the press the fluid contents of the cylinder tend to resist downward movement of the housings and thus act to compress the bale or core which is formed in this press.

The movable housings are provided with bearings for the reception of two shafts 26 and 27, which carry compression rollers 28 and 29, and around these rolls passes a belt or apron 30 which, also, extends over a roller 31 mounted in spring bearings on the main press 12.

The upper fixed housings have bearings for a shaft 32, carrying an upper compression roller 33 and an additional compression roller 34 is also supported by the fixed housings, but is free to move toward and from the lower rear compression roller 29, as hereinafter described.

Mounted in suitable bearings that project from the outer face of the fixed housing is a vertically disposed shaft 36 having a lower portion 37 of rectangular or other non-circular form in cross section. At the upper end of this shaft is a bevel gear 38 which is in constant mesh with a bevel pinion 39 that is mounted on a shaft 19. The upper portion of the shaft 36 carries two loose bevel pinions 40 and 41, that are in constant mesh with a bevel gear 42 secured to a shaft 43 that extends transversely across the machine, and finds bearings in a hollow shaft 44, the latter being carried in bearings that are formed in the fixed housings 17. This shaft 43 carries at the opposite side of the machine a pinion 45 that is in constant mesh with two gear wheels 46 and 47, the gear 46 being fixed to the roller shaft 32, and the gear 47 being fixed to the shaft 48 of the movable roller 34, so that so long as the shaft 43 is rotated, both of the rolls will be positively driven.

The shaft 44 carries a pair of rocker arms 49, the outer ends of which serve as supports for the roller shaft 48, and the housings are provided with arcuate slots 50 to permit the movement of the shaft and roller during the different stages of bale forming and bat compressing operations.

The ends of the roller shaft 48 are hung on sectional levers 52 which are supported by a rock shaft 53, provision being made for turning this rock shaft and thereby effecting raising and lowering of the roller shaft 48, but as this special mechanism forms no part of the present invention, it has not been illustrated in detail.

The adjacent faces of the two loose pinions are provided with clutch hubs 56 and 57, respectively, and these are arranged to be engaged by a double clutch sleeve 58 that is feathered on the shaft 36. This clutch is operated in the manner hereinafter described for the purpose of alternately clutching the upper and lower bevel pinions to the shaft, so that movement is imparted to the upper rolls first in one direction and then in the opposite direction, these rolls receiving movement in the direction indicated by the arrows in Fig. 3 during the formation of the core or small bale, and for rotating in the opposite direction when the auxiliary press is employed for compressing the bat.

On the lower rectangular portion 37 of the shaft 36 is mounted an elongated sleeve 60, the ends of which find bearings in brackets 61 that project from the lower and movable housing. This sleeve 60 carries a bevel pinion 62 which intermeshes with a bevel gear 63 on a shaft 64 extending transversely across the machine and having bearings in the two movable housings. At the opposite end of the shaft 64 is a pinion 65 which intermeshes with a pair of gear wheels 66, so that movement will be imparted to these gear wheels, and the lower roll shafts 26 and 27 on which they are supported. During the operation of the device, the lower housings will move down as the bale increases in size, and the bearings 61 will carry down the sleeve 60, and the bevel pinion 62, so that the latter will be maintained in constant mesh with the bevel wheel 63, no matter what the position of the rolls may be.

Projecting from one of the movable housings is an arm 66' that is provided with an opening for the reception of a vertically movable rod 67, the upper end of which is secured to a rocker arm 68 that projects from a clutch operating rock shaft 69, this shaft 69 being provided with an arm 70 that engages with the double clutch sleeve 58, so that when the shaft is rocked the clutch sleeve will be moved into engagement with one or other of the clutch hubs 56 and 57 for the purpose of locking either the bevel pinion 40 or the bevel pinion 41 to the shaft.

Secured to the rod 67 are two collars 71 and 72, the positions of which may be adjusted in accordance with the size of the small bale or core to be formed. The rod also carries a pair of collars 73 and 74 which are engaged by compression springs 76 and 77, tending to move them away from the collars 71 and 72, and into engagement with the arm 66'.

During the vertical movement of the lower housings, the arm 66' will engage first with one and then with the other of the two collars 73 and 74, and after the resistance of the springs has been overcome, the rods will move in the direction of its length, and will rock the shaft 69, thereby shifting the position of the double clutch sleeve 58.

During the initial core or small bale forming operation of the press, the several rolls will assume the position shown in Fig. 4, and are rotated in the direction indicated by the arrow, so that the entering bat will be turned back by the roll 34, and will be wound up into the form of a small bale or core. During this operation the roll 34 will be gradually raised until its axis is in the horizontal plane of the roll 33, and then as the bale increases in size, the rolls 28 and 29 will be forced downward against the pressure of fluid in the lower cylinder. When a bale of the desired size has been formed, the arm 66' will engage with the sleeve 74 and by moving the latter down, the rod 67 will, also, be pulled down, and the shaft 69 will be rocked, thus operating the clutch arm 70 and moving the clutch sleeve from engagement with the lower hub 57 and into engagement with the hub 56, so that the direction of rotation of the upper rolls 33 and 34 will be reversed, these rolls then operating in the direction indicated at the arrows (Fig. 5). Shortly prior to this, however, the pressure in the lower cylinder is relieved, so that the housings and lower rolls may move down for the purpose of opening the rolls and discharging the small bale or core, and it is only after the rolls have been opened to an extent sufficient to permit the discharge of the bale that the direction of movement of the upper rolls is reversed and the bale is discharged by the apron 30 and the roll 34, and is carried to the main press where the baling operation is completed.

The main press is mounted on sills 80 and is provided with end frames 81 which are connected by longitudinally disposed guide bars or tubes 82. Near one end of the press are fixed housings 83, carrying bearings for shafts 84 on which are mounted compression rolls 85. The bars 82 serve further as guides for movable housings 86 carrying shafts 87, on which are mounted compression rolls 88. The movable housings are connected in any suitable manner to a piston rod 89 that leads into a cylinder 90 and carries a suitable piston which is operated upon by a fluid under pressure admitted to the cylinder. The rolls are driven from a longitudinally disposed shaft 92 which carries at one end a bevel pinion 93, intermeshing with a bevel wheel 94 that is secured to a shaft 95, and this latter shaft is connected by suitable spur gears to the two shafts 84.

The shaft 92 has a rectangular portion 97 on which is mounted a sleeve 98 that extends through a bearing opening formed in a bracket 99 projecting from one of the movable housings. This sleeve carries a bevel pinion 100 that intermeshes with a bevel wheel 101 on a shaft 102, extending through bearings formed in the movable housings, and the opposite end of the shaft is connected by suitable spur gearing to the roller shafts 87.

When the small bale or core formed in the preliminary press is discharged from that press, it is carried by the apron 30 to the main press, and being received in the baling chamber formed between the four rolls, the winding of the bat is proceeded with in the manner shown in Figs. 5 and 6, until a bale of the desired size has been formed.

It is to be especially noted that during the movement of the small bale or core from the preliminary press to the final press, there is no breakage of the bat, the bat partly unwinding and being carried down with the bale into the main press, so that the bale is formed of a continuous unbroken bat.

During the operation of the main press, it becomes desirable to gradually increase the pressure on the bale, so that the outer layers will be condensed to a greater extent than the inner layers. This is preferably accomplished by the employment of a pressure regulating valve 105 which controls the flow of a fluid from a source of pressure supply through the pipe 106 to the cylinder. The stem of this valve is engaged by a lever 108, and one arm of the lever carries an adjustable weight 109, which normally tends to prevent operation of the pressure regulating valve by the opposite arm of the lever 108. This opposite arm of the lever carries a movable weight 110 that is connected by a link 111 to a lever 112. The lever 112 is pivoted at its lower end, and at its upper end carries an outwardly bent arm 113 through which passes a rod 114. The upper end of the rod 114 is threaded and receives an adjusting nut 115 that bears on the arm 113. The lower end of the rod 114 is connected to the rear end of a rod 117 which embraces the lever 112.

The rod 117 is connected to the movable housings and as the housings move back during the progress of formation of the bale, rod 117 will swing the lever 112 to the rear, and the weight 110 will be carried rearward away from the fulcrum of the lever 108, thus acting with greater leverage force on the stem of the pressure regulating valve 105, and gradually increasing the fluid pressure of the cylinder and increasing the resistance offered to the movement of the rear compression rollers and their housings. The cylinder is also provided with a valved discharge pipe 120 which may be opened to allow the escape of the actuating fluid, while the movable housings are drawn back to release the bale, and the front end of the cylinder carries a valved inlet pipe 121, and a valved discharge pipe 122 which control the inlet and discharge of fluid pressure for actuating the piston in the reverse direction and moving the rolls apart, to permit the discharge of the bale.

The actuating fluid of cylinder 23 enters through a pipe 125 which is provided with a valve 126, and the stem of said valve is connected to an operating arm 127. This arm is under the control of a slidable rod 128, having a pair of adjustable collars 129 and 130 which are engaged by a finger 131 depending from the movable bracket 99.

When a bale has been completed, bagged or covered, and is about to be discharged, the attendant opens the discharge valve in pipe 120 at the rear end of the cylinder, and opens the inlet pipe 121, so that fluid under pressure is allowed to enter the front end of the cylinder, and this fluid acts through the piston to withdraw the movable housings and the rear pair of compression rolls, so that the finished bale is allowed to drop down on to an endless conveyer 134, by which it is carried to a weighing scale or other suitable point.

Prior to the bale discharging operation, however, the gradual increase in size of the bale will carry the movable housings rearward and the finger 131 will engage the collar 130, moving the slidable rod 128, the front end of which falls. This results in movement of the operating arm 127, and valve 126 is turned for the purpose of permitting the fluid under pressure to pass into the cylinder 23 of the preliminary press, whereupon the housings and lower rolls of said press are moved upward, and the arm 66′ will engage the collar 73 and by imparting movement to the rod 67 will operate the clutch, forcing the latter into engagement with the lower clutch hub 57, and thus reversing the direction of rotation of the upper set of rolls. This results immediately in the gripping of the bat between the upper and lower rolls 34 and 29, and the bat is severed and turned back to start another core or small bale forming operation, while that part which has already passed between the rolls 29 and 34 will continue over the apron and will be wound on the main bale.

It will be seen that the size of the finished bale will depend on the point of adjustment of the collar 130, and by altering the position of this collar, the bat may be severed at the preliminary press sooner or later in the formation of the main bale, and thus form a bale of any diameter.

The entire operation in brief is as follows:—When the parts are in the position shown in Fig. 4, a bale has been finished in the main press, and the bat has been severed and the end of the bat is being turned for the purpose of forming a small bale or core by the rolls of the preliminary press, these rolls rotating in the direction indicated by the arrows. During the progress of formation of the small bale or core, the lower rolls 28 and 29 will be moved down, and while the rolls are moving down, the finished bale in the main press is covered with bagging and removed, and the rolls of the main press are adjusted approximately to the position shown in Fig. 5. When the small bale of the preliminary press has reached its desired diameter, the downward movement of the arm 66 causes said arm to engage with the collar 74 and exert a downward pull on the rod 67. This immediately shifts the position of the clutch 58, and the direction of rotation of the upper rolls 33 and 34 is reversed, said rolls then turning in the direction indicated by the arrows in Fig. 5, and the bale or core is carried out over the apron 30, and carries the bat with it until the bale is received in the main press. The roll 34 is then allowed to drop, while the lower rolls may be slightly raised until the rolls 34 and 29 act as bat condensing members in order to compress the bat before it reaches the main press. The bale forming operation then continues in the main press in the manner shown in Fig. 6, until the rolls 88 of the main press move rearward and the finger 129 engages the collar 130, whereupon the valve 126 is operated and pressure is admitted to the cylinder 23. This causes the lower housings 20 of the preliminary press to rise, and in so doing the arm 66 will engage against the collar 73, and movement will be imparted to the clutch, shifting of the latter causing the direction of rotation of the rolls 33 and 34 to again reverse, the rolls then moving in the direction indicated by the arrows in Fig. 4. The bat is thus severed while held between the rolls 34 and 29, and the end of the bat is then turned back in the manner shown in Fig. 4 in order to permit the formation of the small bale or core. That portion of the bat which has previously passed beyond the rolls is carried on to and wound around the main bale. After this the backing or wrapping material is introduced into the main press and wound around the finished bale, and the latter is discharged and carried to the weighing scales or other suitable point.

I claim:—

1. A bale forming mechanism embodying a preliminary core forming press, and a main bale forming press, and means for conveying the core from the former to the latter.

2. A bale forming mechanism embodying a preliminary core forming press, a main bale forming press, the former being adapted to receive a continuously fed bat, and means for transferring a complete core from the former to the latter.

3. Baling mechanism embodying a preliminary press and a main press, each having bat winding means, that of the former to form a core and that of the latter to complete the bale and means controlled by the latter for stopping the core forming operation of the former.

4. Baling mechanism having a preliminary press and a main press, each provided with bat winding means, and the former of which is alternately operable as a core former and a condenser, and means actuated by the main press for reversing the motion of the preliminary press.

5. Baling mechanism having a preliminary press and a main press, each provided with bat winding means, means for transferring a partly formed bat from the former to the latter, the preliminary press having bat feeding members from which the bat passes during the winding thereof by the main press, and means controlled by the main press for stopping the feeding movement of said feeding press.

6. A baling system comprising the following instrumentalities:—a bat forming means, a preliminary press to which the bat is fed and by which it is rolled to form a core, a main roller press, and means for transferring the core from the preliminary press to the main press.

7. A baling system comprising the following instrumentalities:—a bat forming means, a preliminary press to which the bat is fed, and by which it is wound into the form of a core, a main roller press, means for adjusting the preliminary press to form a bat condenser during the operation of the main press, and automatic means for effecting the severing of the bat at the preliminary press when the bale is nearly completed.

8. In baling apparatus, a roller press, and means for feeding to the press a previously formed core of rolled cotton.

9. In baling apparatus, a roller press, and means for feeding to the press an unbroken bat the end of which has been wound to form a core.

10. In baling apparatus, an intermittently operable baling press, and means for rolling a bat into the form of a core or small bale between intervals of operation of the press.

11. In baling apparatus, means for winding a portion of a bat in the form of a core or small bale, a roller press, and means for transferring the core or small bale to the roller press, to permit the winding and compressing of the bat into the form of a complete bale.

12. In baling apparatus, an intermittently operable baling press, a preliminary press serving as a bat condenser during the bale forming operation, and means for adjusting the preliminary press to wind the end of the bat into the form of a core between intervals of operation of the main press.

13. In a baling system, the combination of the following instrumentalities:—a roller press, and a means for taking care of a bat between intervals of operation of the press, said means including a bat condenser adjustable to wind the bat to form a small bale or core while the main press is idle.

14. In a baling system, the combination of a preliminary press to which the bat is fed, a main press, an apron for delivering the products of the preliminary press to the main press without breakage of the bat, and automatic means under the control of the main press for adjusting the preliminary press to sever the bat after the main bale is nearly completed.

15. In baling systems, a roller press, and an adjustable means for automatically controlling the operation of the press to produce bales of different diameters.

16. In baling apparatus, an intermittently operable roller press, a continuously operable bat engaging member between the bat forming member and the press, and automatic means under the control of the press for adjusting the intermediate mechanism to alternately act as a core forming means and as a bat condenser.

17. In baling apparatus, an intermittently operable roller press, a bat engaging mechanism between the forming means and the press, and mechanism under the control of the press for governing the operation of said bat engaging mechanism.

In testimony that I claim the foregoing as my own, I have hereto affixed my signature in the presence of two witnesses.

EDGAR REAGAN.

Witnesses:
R. M. TARLTON,
P. H. SWEARINGEN.